US011972415B1

(12) United States Patent
Panes

(10) Patent No.: US 11,972,415 B1
(45) Date of Patent: Apr. 30, 2024

(54) NON-FUNGIBLE TOKEN SYSTEM FOR RANDOMIZED EVENT SESSIONS

(71) Applicant: HPVC, LLC, Bradenton, FL (US)

(72) Inventor: Howard Panes, Bradenton, FL (US)

(73) Assignee: HPVC, LLC, Bradenton, FL (US)

( * ) Notice: Subject to any disclaimer, the term of this patent is extended or adjusted under 35 U.S.C. 154(b) by 0 days.

(21) Appl. No.: 17/581,696

(22) Filed: Jan. 21, 2022

Related U.S. Application Data

(63) Continuation of application No. 17/504,442, filed on Oct. 18, 2021.

(51) Int. Cl.
*G06Q 20/36* (2012.01)
*G06Q 20/06* (2012.01)
*H04L 9/32* (2006.01)
*H04L 9/00* (2022.01)

(52) U.S. Cl.
CPC ....... *G06Q 20/3678* (2013.01); *G06Q 20/065* (2013.01); *H04L 9/3236* (2013.01); *H04L 9/50* (2022.05)

(58) Field of Classification Search
CPC .............. G06Q 20/3678; G06Q 20/065; H04L 9/3236; H04L 2209/38
USPC .......................................................... 705/69
See application file for complete search history.

(56) References Cited

U.S. PATENT DOCUMENTS

| | | | |
|---|---|---|---|
| 11,244,032 B1 * | 2/2022 | Nguyen | |
| 2003/0176211 A1 * | 9/2003 | Sommerville | |
| 2007/0178964 A1 * | 8/2007 | Ghaly | |
| 2009/0143135 A1 * | 6/2009 | Yoshizawa | |
| 2015/0379822 A1 * | 12/2015 | Ellis et al. | |
| 2020/0273048 A1 | 8/2020 | Andon et al. | |
| 2021/0248214 A1 * | 8/2021 | Goldston et al. | |
| 2021/0342909 A1 * | 11/2021 | Ketchel et al. | |

(Continued)

FOREIGN PATENT DOCUMENTS

| WO | WO-2019/213700 A1 | 11/2019 |
| WO | WO2021231911 A1 * | 5/2020 |
| WO | WO2021231911 A1 * | 11/2021 |

OTHER PUBLICATIONS

NFT Megaways, https://www.bigwinboard.com/nft-megaways-red-tiger-slot-review/ (Year: 2021).*

*Primary Examiner* — Neha Patel
*Assistant Examiner* — Yin Y Choi
(74) *Attorney, Agent, or Firm* — Foley & Lardner LLP

(57) ABSTRACT

Embodiments described herein are related to systems and methods for executing randomized event sessions using non-fungible tokens (NFTs). In one aspect, a computer receives token identifiers corresponding to NFTs of a blockchain from one or more client devices. The computer may receive a request to initiate a randomized event session from a session client device. The computer may select a non-fungible token of the NFTs for the randomized event session according to a randomization algorithm configured to randomly identify a token identifier from the token identifiers. The computer may determine, a first award value for the randomized event, based on a value assigned to the non-fungible token, and a second award value based upon a fraction of the first award value. The computer may generate a first award notification indicating the first award value for a first user associated with a first session client device.

30 Claims, 4 Drawing Sheets

(56) References Cited

U.S. PATENT DOCUMENTS

2022/0198447 A1    6/2022  Haruna
2022/0366762 A1*  11/2022  Nelson et al.

* cited by examiner

NON-FUNGIBLE TOKEN SYSTEM FOR RANDOMIZED EVENT SESSIONS

CROSS-REFERENCE TO RELATED APPLICATION

This application is a continuation of U.S. application Ser. No. 17/504,442, entitled "Non-Fungible Token System for Randomized Event Sessions," filed Oct. 18, 2021, which is incorporated by reference in its entirety.

TECHNICAL FIELD

This application generally relates to non-fungible tokens (NFTs), and, more particularly, to systems and methods for executing randomized event sessions using blockchain technology and NFTs.

BACKGROUND

Recent developments in blockchain technology have enabled an owner of digital media to claim ownership of the digital media. For example, a graphic designer, an artist, a video editor, a content creator, or a programmer can create media data such as image data, video data, audio data, application data, or any combination of them, and generate a NFT including or associated with the media data. Each NFT may include a unique token identifier that uniquely identifies a particular NFT and renders the particular NFT non-fungible and non-interchangeable. The non-fungible nature of the NFT allows an owner of the NFT to assert ownership interest in the media. For example, an owner of a NFT may sell the NFT to another or trade the NFT with another for a different NFT. While sales or trades of NFTs are example usages of NFTs, other usages or implementations of NFTs remain unexplored.

SUMMARY

Described herein are systems and methods for facilitating or executing randomized event sessions using blockchain technology, including NFTs. The NFT is a token that includes media data or a pointer (e.g., hyperlink) to a non-transitory storage medium storing the media data. An event host device (e.g., server) identifies NFTs including or associated with media data, and incorporates the media data associated with the identified NFTs into the particular randomization event (e.g., gameplay). For example, the host device may determine or assign, for images, videos, or audios included in or associated with the NFTs, corresponding slots of a slot machine game session, a roulette game session, a card game session, or the like. The client device transmits a request to the host device to initiate or participate in a randomized event session. The host device may execute the randomized event session incorporating the media data of the NFTs. The host device may execute software for hosting a cloud-based gaming application. The player-users access the gaming application services using end-user client devices by executing a web browser or locally installed application executed by a client device. The host device establishes the session with each of the players' client devices and executes a randomizing algorithm in connection with the event. The host device generates a user interface based on the results of the randomizing algorithm and the gameplay configuration, where the user interface presents the player-users with options, inputs, and outputs associated with the gameplay. The host device incorporates media data of the NFTs (e.g., images) into the gameplay operations and the gameplay interface. The host device may generate award notifications based upon the results of the randomization algorithm. The host device may assign an award value to a successful end-user and may further assign an award value to an owner(s) of the NFTs randomly selected by, or selected for, the successful end-user.

In some embodiments, a computer-implemented method includes receiving, by a computer, one or more token identifiers corresponding to one or more non-fungible tokens of a blockchain from one or more client devices; receiving, by the computer, a request to initiate a randomized event session from one or more session client devices; executing, by the computer, a randomization algorithm that randomly identifies a token identifier associated with a non-fungible token of the plurality of non-fungible tokens; updating, by the computer, a user interface using media data of the non-fungible token identified from executing the randomization algorithm; determining, by the computer executing a smart contract, a first award value for the randomized event session based on the non-fungible token, and a second award value based upon a fraction of the first award value; and generating, by the computer, a first award notification indicating the first award value for a first user associated with a first session client device.

In some embodiments, a computer comprising a processor configured to: receive a plurality of token identifiers corresponding to a plurality of non-fungible tokens of a blockchain from one or more client devices; receive a request to initiate a randomized event session from one or more session client devices; execute a randomization algorithm that randomly identifies a token identifier associated with a non-fungible token of the plurality of non-fungible tokens; update a user interface using media data of the non-fungible token identified according to the randomization algorithm; execute a smart contract to determine a first award value for the randomized event session based on the non-fungible token, and a second award value based upon a fraction of the first award value; and generate a first award notification indicating the first award value for a first user associated with a first session client device.

A computer storage medium having machine-executable instructions stored thereon that, when executed by one or more processors, cause the one or more processors to: receive one or more token identifiers corresponding to one or more non-fungible tokens of a blockchain from one or more client devices; receive a request to initiate a randomized event session from one or more session client devices; execute a randomization algorithm that randomly identifies a token identifier associated with a non-fungible token of the plurality of non-fungible tokens; update a user interface using media data of the non-fungible token identified by executing the randomization algorithm; execute a smart contract to determine a first award value for the randomized event session based on the non-fungible token, and a second award value based upon a fraction of the first award value; and generate a first award notification indicating the first award value for a first user associated with a first session client device.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures

DETAILED DESCRIPTION

Figure 1A:
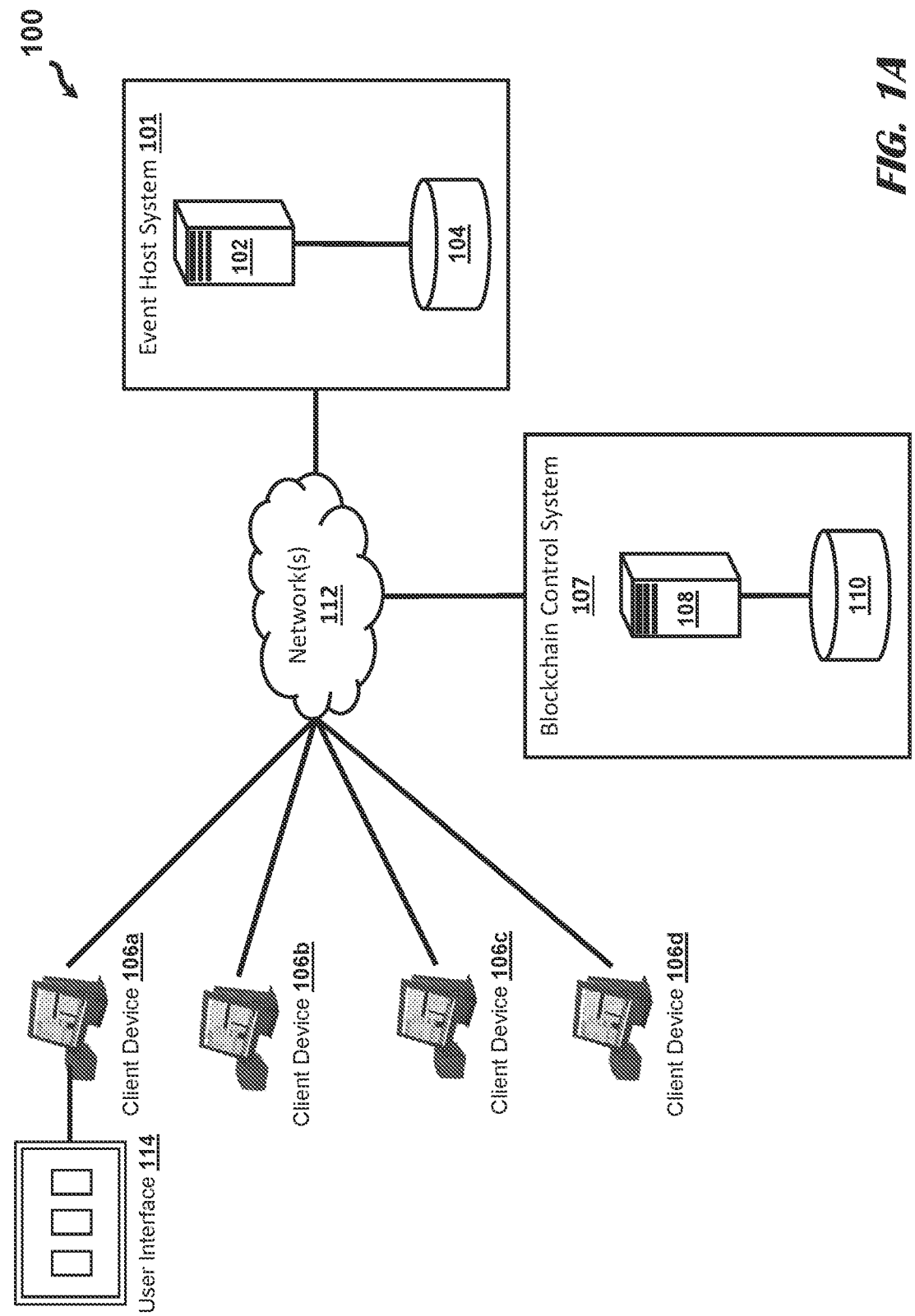
FIG. 1A illustrates a randomized event system based on NFTs, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Described herein are systems and methods for facilitating or executing randomized event sessions using blockchain technology, including NFTs. The NFT is a token that includes media data or a pointer (e.g., hyperlink) to a non-transitory storage medium storing the media data. Non-limiting examples of the media data may include, but is not limited to, image data, video data, audio data, or any combination of them. Each NFT may include a unique token identifier that uniquely identifies the particular NFT and renders the particular NFT non-fungible, such that the NFT is essentially non-interchangeable with other NFTs or blocks of the blockchain.

Embodiments may include a system having client devices that participate as nodes of the blockchain, where the NFTs stores identifiers, addresses or pointers to NFTs, and an event host device (sometimes referred to as "host device" herein) that controls or maintains randomized event sessions according to the NFTs. Randomized event sessions may include a game session, a gambling application session, simulations, modeling, or any event session that an outcome of the session is determined based on random values.

The client device and the host device may be any computing devices, such as smart phones, desktop computers, tablet PCs, servers, etc. In one approach, the host device identifies NFTs including or associated with media data, and obtain the media data associated with the identified NFTs. The host device may incorporate the media data into the randomized event session. For example, the host device may determine or assign, for images, videos, or audios included in or associated with the NFTs, corresponding slots of a slot machine game session, a roulette game session, a card game session, etc. In one approach, the client device transmits a request to the host device to initiate or participate in a randomized event session. The host device may execute the randomized event session incorporating the media. Alternatively or additionally, the host device may allow the client device to execute the randomized event session incorporating the media.

For instance, the host device may execute software for hosting a cloud-based gaming application. The end-users access the gaming application services by executing a web browser or locally installed application executed by a client device. The end-user may enter an input for selecting a particular event, such as a game (e.g., roulette game, slots game) or other service, instructing the client device to establish a session with the host device. The host device establishes the session with each of the client devices and executes a randomizing algorithm in connection with the event. The host device generates a user interface based on the results of the randomizing algorithm and the gameplay configuration, where the user interface presents the player-users with options, inputs, and outputs associated with the gameplay. The host device incorporates media data of the NFTs (e.g., images) into the gameplay operations and the gameplay interface.

As an example, the host device includes a webserver that hosts a gaming website allowing users to access gaming sessions (or "rooms") for particular games, such as roulette, slots, lottery, or other games. The host device establishes event sessions with the client devices that accessed the particular room. The host device generates user interfaces presenting the client devices with gameplay and/or administrative options. The host device executes the randomization algorithm to generate random or pseudo-random results, thereby emulating the element of chance related to the gameplay. The host device extracts an image (or other media data) of a plurality of NFTs and incorporates the image into the gameplay and the gameplay interface.

In a roulette example, the user interface includes the NFTs available for the users to select for wagers. The host device generates the gameplay interface representing a virtual roulette wheel containing the images from the NFTs. The player may select a particular NFT on which to wager. The randomization algorithm then randomly selects an image, address, or other NFT-identifier as the winning NFT. The host device determines that one or more players won, when the one or more players entered wagers for the particular winning NFT.

In a slots example, the host device generates a user interface representing reels of a virtual slot machine, where the reels include the images of the NFTs. The randomization algorithm then randomly selects an image, address, or other NFT-identifier for each of the virtual reels. The host device assigns score values to the NFTs. In a conventional slot game, a winner is determined by the pictures that line up with a pay line across the reels, and the payout depends on which pictures are aligned with the pay line. In the embodiments herein, the host device may determine whether the player won based on the score values assigned to the pictures and/or NFTs selected by the randomization algorithm for the virtual reels. The host device may also initiate an automatic transmission representing a payout to an owner who has an NFT appearing in the pay line for a winning player.

In a "competitive" slots example, the randomization algorithm randomly selects the NFTs for each player's virtual slot machine. The host device determines output scores for each particular player based upon the score values of the NFTs randomly selected by the host device for the particular player, and the player with the highest output score wins.

The host device identifies the winning player having the winning output score. The host device may also initiate an automatic transmission representing a payout to an owner who has an NFT appearing in the selected images for a winning player.

In some implementations, the host device may determine weighted values of NFTs (or weighted values of the associated media), and execute a randomized even algorithm according to the weighted values. For example, the host device may adjust a probability of success with a NFT in the randomized event session, according to the weighted value of the NFT (or the weighted value of the associated media). A weighted value of the NFT may correspond to or may be proportional to the market value of the NFT traded on a public market platform (e.g., Rarible, NFT stars, Crypto. com, VeVe, etc.). In one aspect, the host device assigns a weighted value for a NFT, according to a number of other NFTs having the media data, a currency value, a third-party value received from a third-party device, or any combination of them. Assuming for an example that a first image of a particular dog has a higher value than a second image of a raven, the host device may assign or allocate the first image of the dog to a fewer number of slots than a number of slots allocated for the second image of the raven in a slot machine game session or a roulette game session. Hence, the probability of winning the slot machine game session or the roulette game session with the images of the dog may be lower than the probability of winning the slot machine game session or the roulette game session with the images of the raven.

The host device may provide different amounts of award for the success in the randomized event session to client devices, according to values of the NFTs. In one approach, the host device may determine the amount of award for the success in the randomized event session, according to the adjusted probability of success. For example, the host device may assign or allocate a larger amount of award, if the user wins the slot machine game session or the roulette game session with a slot including media with a lower probability of success. In one approach, the host device may determine the amount of award for the success in the randomized event session to be proportional to the values of the NFTs. For example, the host device may assign or allocate a greater amount of award if the user wins the slot machine game session with a slot including a rarer NFT or with more valuable NFT.

The host device accesses the NFTs of other owners to incorporate the media data included in or associated with the NFTs into the randomized event session, and automatically distribute a portion or a fraction of award. The host device may automatically allocate the award to one or more owners or accounts associated with the NFTs corresponding to portions of the award. In one approach, the host device may determine an amount of award for the owner or account associated with the NFT to be a fraction of the award allocated to the player that initiated or participated in the randomized event session. In some circumstances, the player may be a different user from the owner associated with the NFT. The owners of the NFTs are encouraged and incentivized to share or allow the host device to utilize the NFTs for the randomized event sessions.

Although various embodiments disclosed herein are provided with respect to a roulette game session or a slot machine game session, the principle of incorporating NFTs or digital media data of the NFTs and distributing award according to values of the NFTs disclosed herein can be applied to any event session with outcomes determined based on randomness or random values.

FIG. 1A illustrates a randomized event system 100 based on NFTs 152a, 152b, 152c (collectively referred to as NFTs 152), according to an embodiment. The system 100 includes an event host system 101, any number of client computing devices 106a-106d (e.g., collectively referred to as client devices 106), and a blockchain control system 107, which communicate via one or more communication network 112. The host system 101 includes an event host device 102 (also referred to as "a host device 102" or "a host server 102" herein) and a host database 104, which communicates to the host device 102. The blockchain control system 107 includes a blockchain control device 108 and a blockchain control database 110, which communicates to the blockchain control device 108. Embodiments may comprise additional or alternative components or omit certain components from those of FIG. 1A, and still fall within the scope of this disclosure. The system 100 may, for example, include any number of event host devices 102, client devices 106, and blockchain control devices 108. In some embodiments, the system 100 may include a third-party payment system that communicates with the client devices 106, the event host system 101, the blockchain control system 107, or any combination thereof, through the network 112. Embodiments may include or otherwise implement any number of devices capable of performing the various features and tasks described herein. For example, FIG. 1A shows the host device 102 as a distinct computing device from the host database 104, though a single computing device may comprise both the host device 102 and the host database 104. As another example, FIG. 1A shows the host system 101 and the blockchain control system 107 as distinct computing systems, though the host system 101 and the blockchain control system 107 may be implemented as a single system or operated by a single entity.

In some embodiments, some process performed by the host system 101 may be performed by the blockchain control system 107 and/or the client device(s) 106. In some embodiments, some process performed by the client device 106 may be performed by the host system 101, and/or the blockchain control system 107. In some embodiments, some process performed by the blockchain control system 107 may be performed by the host device 102, and/or the client device(s) 106.

The various components of the system 100 and of the computing infrastructures 101, 107 may be connected with each other via hardware and software components of one or more external networks or internal networks (collectively referred to as networks 112). Examples of such networks 112 include, but are not limited to, Local Area Network (LAN), Wireless Local Area Network (WLAN), Metropolitan Area Network (MAN), Wide Area Network (WAN), and the Internet. The communication over any particular network 112 may be performed in accordance with various communication protocols, such as Transmission Control Protocol and Internet Protocol (TCP/IP), User Datagram Protocol (UDP), and IEEE communication protocols, among others.

The computing infrastructures 101, 107 include the host system 101 and the blockchain control system 107, each of which comprises any number of computing devices (e.g., host device 102, blockchain control device 108), non-transitory machine readable storage (e.g., host database 104, blockchain control database 110), and one or more internal computing networks, which may be distinct from the one or more system networks 112, among other components. For ease of describing certain aspects and use cases, the system 100 of FIG. 1A includes the host system 101 and the blockchain control system 107, though embodiments may include any number of such computing infrastructures 101, 107 of various types.

The system 100 includes any number of computing devices that participate as nodes of a distributed ledger, such as the host device 102, the blockchain control device 108, and the client devices 106, among others. The system 100 further includes the blockchain control system 107 and the event host system 101. For ease of description, the system 100 concentrates and centralizes certain features of the blockchain 150 at the blockchain control system 107, though the amount of centralization may vary across embodiments. The blockchain control system 107 may generate blockchain blocks or NFTs 152 including or associated with media data, such as image data, video data, audio data, or any combination of them.

The blockchain control system 107 may issue and validate cryptographic certificates of NFTs 152. In FIG. 1A, the blockchain control device 108 of the blockchain control system 107 executes certificate authority software to issue, evaluate, and revoke certificates, and the blockchain control database 110 stores certificates, cryptographic keys, and other information related to the certificates. Other embodiments, however, may include any number of certificate authorities hosted by any number of computing devices.

The blockchain control device 108 executes software programming related to managing the blockchain 150 and hosting the various services described herein. The blockchain control device 108 includes any computing device having computing hardware (e.g., processors, non-transitory memory) and software for performing the various processes and tasks described herein. Non-limiting examples of the blockchain control device 108 include servers, desktops, laptops, tablets, and the like. Although FIG. 1A shows only one computing device as the blockchain control device 108, the blockchain control device 108 could include any number of computing devices.

The blockchain control device 108 hosts a cloud-based app for managing operations of the system 100. In some cases, the cloud-based app is entirely web-based (e.g., web portal), whereby the computing devices of the system 100 access the cloud-based app through a web browser. In such cases, the blockchain control device 108 (or other computing device of the blockchain control system 107) executes webserver software for hosting an accompanying website. Additionally or alternatively, the blockchain control device 108 publishes the cloud-based app as software for local installation and execution at the computing devices of the system 100. The computing devices of the system 100 execute the app locally, which accesses the services hosted by the blockchain control device 108. In operation, the client device 106 executes the cloud-based app (e.g., browser, locally installed software program) to access the blockchain control device 108, which presents a user interface to an end-user and enables the end-user to interact with the various features of the system 100.

In one aspect, the blockchain control device 108 functions as the certificate authority. In this capacity, the blockchain control device 108 issues, evaluates, and revokes certificates or encryption keys for end-users or entities. The blockchain control device 108 (or other device of the system 100) may further execute software for performing authentication operations to authenticate the users and/or the NFTs 152. The blockchain control device 108 issues each NFT 152 a certificate or set of cryptographic keys, later employed by the users and referenced by the blockchain control device 108 when performing various operations associated with the NFTs 152.

In some implementations, the blockchain control device 108 applies NFT-owner consent thresholds that require the owner's permission to employ an NFT perform various operations or transactions. For example, the blockchain control system 107 requires the owner's consent whenever the blockchain control device 108 receives a custody transfer request for NFT 152 from the blockchain control system 107, the event host system 101, or other client device 106 of the system 100. The blockchain control device 108 may execute the transaction on the blockchain 150 to reflect the change of custody only after receiving a consent instruction from the NFT owner. As another example, the blockchain control system 107 may require the owner's consent whenever the blockchain control device 108 receives a request to access NFT 152 or media data associated with the NFT 152 from the blockchain control system 107, the event host system 101, or other client device 106 of the system 100. In some cases, one or more databases 104, 110 of the system 100 stored consent instructions for the particular NFT 152, which the blockchain control device 108 or the event host system 101 may query to determine whether the consent requirement is satisfied.

Figure 1B:
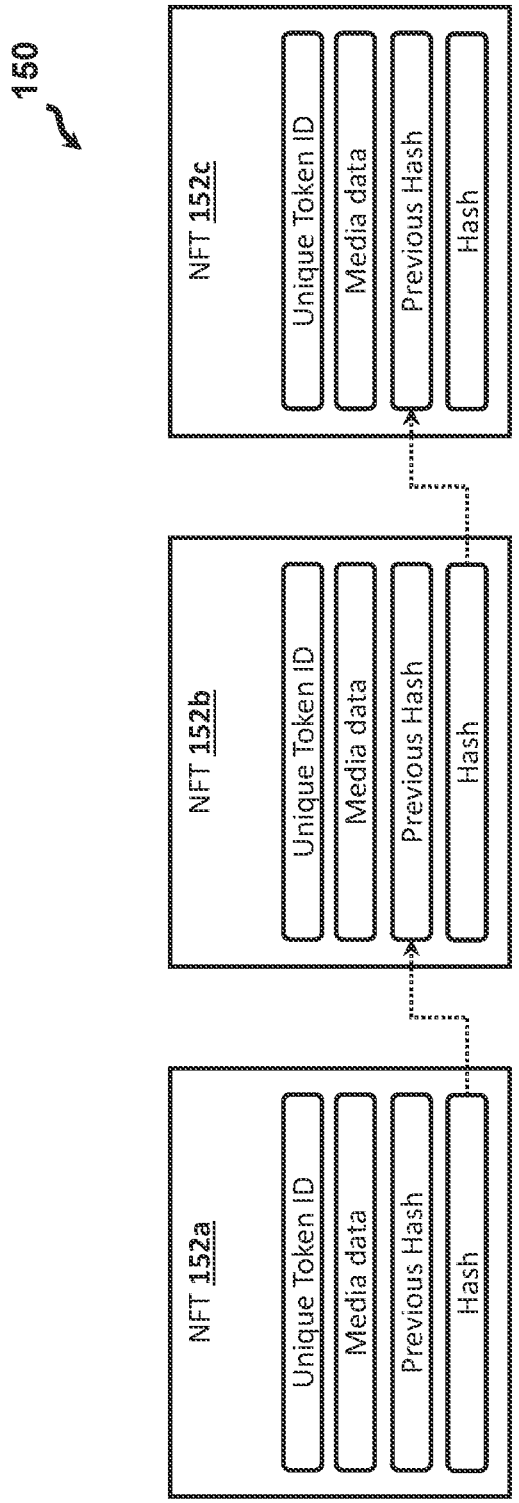
FIG. 1B shows a blockchain implemented by the system of FIG. 1A, according to an embodiment.

As mentioned, for ease of description and understanding the embodiment of FIG. 1A and FIG. 1B include the blockchain control device 108 performs the operations of managing and updating the blockchain 150. Embodiments, however, need not be as structured or localized. Embodiments may include any number of computing devices of the system 100 that generate blocks or otherwise update to the blockchain 150, provided such computing devices are participating nodes of the blockchain 150.

The blockchain control database 110 stores various types of data or information used for performing the processes and tasks described herein. The blockchain control database 110 is hosted by any computing device having computing hardware (e.g., processors, non-transitory memory) and software capable of hosting the information and executing queries received from the blockchain control device 108 or other components of the system 100. The data stored by the blockchain control database 110 may include NFTs 152 or media data, though some or all of the data may be stored in instances of the blockchain 150 or blocks at distributed nodes participating nodes of the blockchain 150 (e.g., client devices 106). In some embodiments, the blockchain control database 110 stores instances of the blockchain 150 and/or certain types of data, whereby the blockchain control database 110 may function as a "source of truth" for the system 100.

The blockchain 150 may include one or more smart contracts that include machine-readable software instructions, executed by the event host device 102 or other device of the system 100 (e.g., control server 108, client device 106). In operation, when the event host device 102 executes the software for conducting the randomization event the event host device 102 executes a smart contract for taking possession of the NFTs 152 for performing the randomization event. The smart contract updates a transaction block of the blockchain 150 or other transaction data accessible to the devices of the system 100, indicating that the event host device 102 incorporated the NFTs 152 into the event session, thereby inhibiting the owner(s) of the NFTs 152 from conducting other transactions or operations using the NFTs 152. The smart contract may further indicate payment information associated with the user accounts of the owner(s) of the NFTs 152. When the event host device 102 terminates the event session, the smart contract updates a transaction block or transaction data indicating that the NFTs 152 have been released and may be employed in further transactions or operations.

FIG. 1B shows data flow for the blockchain 150 implemented by computing devices participating as nodes of the blockchain 150. The blockchain 150 may include any number of blocks representing various types of data. The blockchain 150 comprises any number of blocks or NFTs 152. The blockchain control device 108 or the event host device 107 may generate or mint the NFTs 152 for distribution to, and use by, the various devices of the system 100. In other embodiments, however, any number of devices may mint NFTs 152. For example, in some embodiments, the blockchain control system 107 and the event host system 101 may be implemented as a single device or system that mints NFTs 152. As another example, in some embodiments, any of the host device 102, blockchain control device 108, or the client devices 106 may mint NFTs 152, or may instruct the blockchain control device 108 to mint NFTs 152. Each NFT 152 may include a unique token identifier ("unique token ID"). The unique token ID allows the blockchain control device 108 or other participating nodes to locate, access, or retrieve the particular NFT 152 associated with the unique token ID. Each NFT 152 may also include corresponding media data (e.g., image data, video data, audio data, etc.), or include identifiers, addresses, or pointers to the corresponding media data. In some embodiments, each NFT 152 is associated with different media data. For example, the NFT 152A includes a first media data (e.g., image data) of a particular dog, the second NFT 152B includes a second media data (e.g., image data) of a raven, and the third NFT 152C includes a third media data (e.g., image data) of a circle shape symbol.

The blockchain 150 may include entries of various types, such as blockchain blocks and NFTs 152. A blockchain block is a discrete unit of data entered to the blockchain 150. The block contains various types of related data such that the block represents a certain type of information relevant to the blockchain 150. The block's data also includes various cryptographic identifiers that associate the block with the blockchain 150. For instance, the NFT 152b includes a prior hash value of a prior NFT 152a and a hash of the NFT 152b. Similarly, the NFT 152c includes the prior hash of the prior NFT 152b and a hash of the NFT 152c. This is merely an example and not limiting on potential data values or algorithms for the blocks. The NFTs 152 are a type of blockchain block that include more uniquely identifying data (e.g., unique token ID, media data) than other blockchain blocks, and typically require more computationally expensive algorithmic operations to generate. The NFTs 152 may represent unique types of information (e.g., media data) and/or unique off-chain assets, because each NFT's 152 unique data entries and unique identifiers render the NFTs 152 non-fungible— not freely interchangeable. In some case, the NFT 152 may include pointers to storage memory locations containing actual values of media data. In one aspect, each NFT 152 represents associated unique media or unique portions of the media. Each NFT 152 contains, for example, unique token identifier information and unique information about the media. The NFTs 152 may be generated using algorithms that take multiple cryptographic values (e.g., encryption key, digital signature, digital certificate, salt, seed) and unique media data to output the one or more unique identifiers. The NFTs 152 may also contain the unique data corresponding to the owners of the NFTs 152, or corresponding to client devices 106s of the owners, furthering the uniqueness of this particular block-entry to the blockchain 150. The NFTs 152 are not feasibly interchangeable or exchangeable with another NFT or token (not shown) in the blockchain 150 or another blockchain (not shown). The terms "block" and "NFT" 152 merely refer to types of entries of the blockchain 150 and do not limit potential embodiments.

Referring back to FIG. 1A, the event host system 101 facilitates randomized event sessions based on NFTs 152. The host device 102 executes software programming related to executing randomized event sessions based on NFTs 152 and hosting the various services described herein. The host device 102 may also execute software programming related to distributing award for the randomized event sessions based on NFTs 152. The host device 102 includes any computing device having computing hardware (e.g., processors, non-transitory memory) and software for performing the various processes and tasks described herein. Non-limiting examples of the host device 102 include servers, desktops, laptops, tablets, and the like. Although FIG. 1A shows only one computing device as the event host device 102, the event host device 102 could include any number of computing devices.

The event host device 102 may host a cloud-based app for managing operations of the system 100. In some cases, the cloud-based app is entirely web-based (e.g., web portal), whereby the computing devices of the system 100 access the cloud-based app through a web browser. In such cases, the event host device 102 (or other computing device of the blockchain control system 107) executes webserver software for hosting an accompanying website. Additionally or alternatively, the event host device 102 publishes the cloud-based app as software for local installation and execution at the computing devices of the system 100. The computing devices (e.g., client devices 106) of the system 100 execute a web browser or locally installed app, which accesses the services hosted by the host device 102. In operation, the client device 106 executes the cloud-based app (e.g., browser, locally installed software program) to access the event host device 102, which presents a user interface to an end-user and enables the end-user to interact with the various features of the system 100.

The client devices 106 may function as participating nodes of the blockchain 150. The client device 106 includes any computing device having computing hardware (e.g., processors, non-transitory memory) and software for performing the various processes and tasks described herein. Non-limiting examples of the client devices 106 include smart phones, servers, desktops, laptops, tablets, and the like. In some embodiments, the client devices 106 have various configurations based upon the roles of the intended users. For example, the client device 106a may access certain features of the cloud-app that are different from the features accessed by the client device 106b or client device 106c. In some embodiments, the client devices 106 include gaming devices (e.g., slot machine, roulette wheel) physically located within a casino hosting the event host system analytics system 101 and/or the blockchain control system 107.

The client devices 106 may display a user interface 114 for an output of the host device 102. In one example, the user interface 114 may include one or more graphical elements that are to be filled by the host device 102 upon executing the randomization algorithm. In the illustration of FIG. 1, three graphical elements are depicted, though any number of graphical elements may be utilized. The selected images are inserted into the graphical elements on the user interface 114. In a game such as a slot, a pay line extending through these images may determine that the player is a winner and the owner of an NFT in the pay line receives a payout. In a game such as roulette, a single graphical element may be used for the winning image, and other graphical elements may be used to depict nearby or other positions on the roulette wheel. In a lottery, the graphical elements may depict winning images, and a player may win depending on how many images of the winning images are identified on the player's lottery ticket.

In some embodiments, the client devices 106 comprise one or more peripheral interfaces for receiving validating inputs from receives. Non-limiting examples of the types of interfaces may include USB, PCI, RFID, NFC, or other technology for inputting validating inputs (e.g., digital certificate, digital signature) into a workstation using a physical device. In operation, the client device 106 transmits the validating input to other nodes of the system 100 to validate certain transaction operation or authenticate the particular user. Alternatively, the client device 106 executes the particular transaction operation locally and, as such, executes the particular validation or authentication operation locally using the validation input received from the user.

The event host device 102 obtains the media data associated with NFTs 152 to host and execute the randomized event sessions based on permissions or other data associated with the NFTs 152. The event host device 102 may allow a user of a client device 106 to create an account in the host database 104 for sharing or applying one or more NFTs 152 in randomized event sessions. Each account may be associated with a blockchain wallet in the blockchain 150. The event host device 102 may receive, from one or more client devices 106, one or more token IDs and a permission indication to utilize the NFTs 152 or the media data associated with the NFTs 152 in randomized event sessions. The event host device 102 may query the blockchain control system 107 and access NFTs 152 referenced by the token IDs. For example, the event host device 102 may transmit, to the blockchain control system 107, an access request including token IDs of the NFTs 152 to access the NFTs 152. In response to the request, the event host device 102 may receive, from the block chain control system 107 or from the blockchain 150, the requested NFTs 152 or receive information or key to access the requested NFTs 152. Where the NFTs 152 include the media data, the event host device 102 may obtain the media data directly from the NFTs 152. Where the NFTs 152 include identifiers, addresses, or pointers of storage medium storing the media data, the event host device 102 may obtain the media data from the storage medium as indicated or referenced by the identifiers, addresses or pointers in the NFTs 152. The event host device 102 may store the obtained media data by the host database 104.

In operation, the event host device 102 incorporates the media into randomized event sessions. For example, the host device 102 assigns image data or video data stored by the host database 104 to corresponding slots of a slot machine game session or a roulette game session. The image data or video data may be presented at corresponding slots through the user interface. Each slot may be assigned to a corresponding value (or a slot number), such that a slot or a corresponding NFT 152 can be identified by the corresponding value (or the slot number). In one aspect, the host device 102 determines weighted values of NFTs 152 (or weighted values of the associated media) for setting or preparing the randomized event session, according to the weighted values of the NFTs 152 (or weighted values of the media). For each NFT 152, the host device 102 may query the blockchain control system 107, oracle device that accesses data external to the system 100, or a blockchain platform external to the system 100, such as a public market platform (e.g., Rarible, NFT stars, Crypto.com, VeVe, etc.), and determine the weighted value of the NFT 152 to be proportional to the last traded market value of the NFT 152, or an average market value of the NFT 152 over a predetermined time period (e.g., 6 months). Alternatively or additionally, the host device 102 may determine a type of digital media of the NFT 152, and assign a corresponding value for the determined type as the weighted value of the NFT 152. Examples of types of digital media include image data type, video data type, audio data type, etc. The types of digital media may be also categorized according to subject or content in the digital media data (e.g., animal image type, symbol image type, automobile image type, celebrity image type, cartoon image type, etc.). The host device 102 may also determine the weighted value of the NFT 152 to be proportional to an average market value of NFTs 152 owned by the same owner or associated with the same blockchain wallet address.

The host device 102 may adjust a probability of success in the randomized event session, according to the weighted values of the NFTs 152 (or values of the media). The probability of success for media data or NFT 152 may be inverse proportional to the weighted value of the media data or the NFT 152. Assuming for an example that a first image of a particular dog has a higher value than a second image of a raven, the host device 102 may assign or allocate the first image of the dog to a fewer number of slots than a number of slots allocated for the second image of the raven in a slot machine game session or a roulette game session. Hence, the probability of winning the slot machine game session or the roulette game session with the images of the dog may be lower than the probability of winning the slot machine game session or the roulette game session with the images of the raven.

The host device 102 receives, from a session client device, a request to initiate or participate in a randomized event session. A session client device may be the client device 106 operated by an owner of the client device 106, or a shared computing device (e.g., kiosk) that is publicly available and operated by the same entity that operates the host system 101. In one aspect, the user of the session client device may be an owner of one or more NFTs 152, but the user of the session client device need not own any NFT 152 in some cases. The request may include a blockchain wallet address or an account information (e.g., credit or bank account information) of a user of the session client device, and an amount of wager or an amount of risk to participate in the randomized event session. The amount of wager may be predetermined by the host device 102 or selected by the user through the user interface executed by the session client device. The blockchain wallet address may be an address of a blockchain wallet of the blockchain control system 107 or a different blockchain control system. The host device 102 may query the blockchain control system to verify whether the blockchain wallet address is valid or not, and whether sufficient funds (e.g., crypto-assets) exist for the blockchain wallet address. Similarly, the host device 102 may query the third-party device operated by a financial institution to verify whether the user account is valid or not, and whether sufficient funds (e.g., crypto-assets) exist for the user account. In some embodiments, the request also includes a user-selection in the randomized event session. For example in a roulette game session, the user may select one or more slots including a particular digital media or image.

After verifying that the user has sufficient funds to participate in the randomized event session, the host device 102 may allow the client device 106 to participate in randomized event sessions. In some embodiments, the host device 102 executes the randomized event session incorporating media data of the NFTs 152. The host device 102 may execute one or more randomization algorithms configured to randomly identify or select a token ID from a set of token IDs corresponding to available slots in the random event session. For example, the randomization algorithm may generate one or more random values, where the one or more random values may correspond to one or more slots or token IDs. In some embodiments, the host device 102 determines the outcome of the randomized event session by determining whether the randomization algorithm generated a particular pattern or sequence of random values. For example, in a slot machine game session, the host device 102 determines that the user is successful in the randomized event session, if three identical random values are generated. In some embodiments, the host device 102 determines the outcome of the randomized event session, by comparing (i) a random value generated and (ii) a slot number of an image or NFT 152 selected by the user. For example, in a roulette machine game session, the host device 102 determines that the user is successful in the randomized event session, if the random value generated matches a slot value or a slot number associated with the selected image or NFT 152. The host device 102 may generate and transmit result information indicating an outcome of the randomized event session to the client device 106 to notify the user.

In some embodiments, the client device 106 may execute the randomized event session incorporating media data of the NFTs 152. The host device 102 may transmit, to the client device 106, event configuration information indicating how the randomized event session is arranged or configured (e.g., a number of slots, locations of slots for corresponding images, a probably of success for each slot or image, etc.). Based on the event configuration information from the host device 102, the client device 106 may set up and execute the randomized event session. For example, the client device 106 may generate random values through the randomization algorithm, and determine the outcome of the randomized event session as described above. For example, the client device 106 determines the outcome of the randomized event session by determining whether the randomization algorithm generated a particular pattern or sequence of random values. For example, the client device 106 determines the outcome of the randomized event session, by comparing (i) a random value generated and (ii) a slot number of image or NFT 152 selected by the user. The client device 106 may execute multiple randomized event sessions based on the event configuration information. The client device 106 may generate and transmit result information indicating the outcome of the randomized event session to the host device 102. The client device 106 may transmit the result information after completing each randomized event session, after completing a predetermined number of event sessions, and/or periodically (e.g., every 30 minutes). Advantageously, executing the randomized event session by the client device 106 can help conserve computational resources of the host device 102. Moreover, by executing the randomized event session by the client device 106, the outcome of the randomized event session may be presented to the user in a prompt manner with reduced delay, because the client device 106 may not have to wait for the result information from the host device 102.

The host device 102 determines award for a user account associated with the session client device participated in or initiated the randomized event session based on NFTs 152. The award may correspond to or may be proportional to the amount of wager in the request from the session client device. The host device 102 may provide different amounts of award for the success in the randomized event session to the session client device, according to weighted values of the NFTs 152 or weighted values of media data associated with the NFTs 152. In one approach, the host device 102 may determine the amount of award for the success in the randomized event session, according to the adjusted probability of success. For example, the host device 102 may assign or allocate a larger amount of award, if the user wins the slot machine game session or the roulette game session with an image having a lower probability of success. The host device 102 may determine the award by multiplying the amount of wager in the request by a coefficient that is inverse proportional to the probability of success for that NFT 152, or by multiplying the amount of wager in the request by the weighted value. The host device 102 may generate an award notification indicating the determined award for the session client device, and transmit the award notification to the blockchain control system 107 or a third-party device operated by a financial institution (e.g., bank or a credit card company) to authorize payment of the award to the payment account associated with the user account.

In one aspect, the host device 102 also determines and distributes award to user accounts associated with owners of NFT 152. In one approach, the host device 102 determines an amount of award for the owner or account associated with the NFT 152 to be a fraction (e.g., a predetermined percentage) of the award allocated to the user that initiated or participated in the randomized event session. The host device 102 may generate an award notification indicating the determined award for each client device 106 associated with the owner of NFT(s) 152, and transmit the award notification to the blockchain control system 107 or a third-party device operated by a financial institution (e.g., bank or a credit card company) to authorize payment of the award to the payment account associated with the owner of the NFT(s) 152. Accordingly, the usages and applications of NFTs 152 can be expanded by allowing digital media data of NFTs 152 to be incorporated into randomized event session that is initiated by a session client device different from client devices 106 operated by owners of NFTs 152.

In some embodiments, the event host device 102 may conduct a placement auction allowing NFT owner-users to bid for opportunities to include the owners' NFTs 152 in randomization events. The event host device 102 receives bids from the client devices 106 of the NFT owners, and incorporates the winner owner's NFT 152 into the randomized event sessions. In operation, the client devices 106 of the owners access an auction event session hosted by the event host device 102, during which the event host device 102 receives and evaluates bids according to preconfigured rules. The owners enter the bids via an auction interface that instructs the client devices 106 to submit the bids to the event host device 102. The event host device 102 identifies the winning owner having the winning bid (e.g., highest dollar amount) and determines one or more NFTs 152 of the winning owner to incorporate into a current or future randomized event session. The event host device 102 determines the NFT 152 of the winning owner based upon an indicator received with the bid or according to a selection input received from the client device 106.

When establishing and hosting a randomized event session, the event host device 102 selects a subset of the NFTs 152 to incorporate into the randomized event session according to any number of configurations. For example, in embodiments involving the placement auction, the event host device 102 selects the NFTs 152 of winning owners. Additionally or alternatively, the event host device 102 may randomly select the NFTs 152.

In some embodiments, a client device 106a is a gaming machine (e.g., roulette apparatus, slot machine apparatus) physically located within a casino, and another client device 106b is a mobile device containing a blockchain wallet of the user. The user may be a player, an NFT owner, or both. Where the user is both the player and the NFT owner, the client device 106a or the event host device 102 accesses the user's blockchain wallet to identify the NFTs 152 available to include in the user interface 114 during gameplay. The event host device 102 may automatically access the blockchain wallet according to one or more triggering conditions. For example, event host device 102 may detect proximity of the mobile client device 106b based upon a geo-fence or geographic identifier received from the mobile client device 106b indicating that the mobile client device 106b is within a threshold distance from the gaming client device 106a (e.g., within the casino or on the casino floor). In another example, the event host device 102 may determine that the mobile client device 106b entered the casino upon detecting that the mobile client device 106b established a wireless connection (e.g., Wi-Fi, Bluetooth, NFC) with the gaming client device 106a, a wireless access point, or a wireless beacon.

The event host device 102 accesses software of the mobile client device 106b and requests the mobile client 106b to provide one or more NFTs 152 of the blockchain wallet. The mobile client device 106b or the event host device 102 executes programming of a smart contract to generate a transaction block or transaction data indicating that the one or more NFTs 152 are temporarily transferred to the blockchain wallet of the event host device 102. The user may interact with the software of the mobile client device 106b to select the NFTs 152 available to the event host device 102 for gameplay, thereby allowing the user to offer certain NFTs 152 in the casino games while the user is in the casino. In such a configuration, the NFTs 152 may be withdrawn from the games upon detecting that the user has left the casino.

Figure 2:
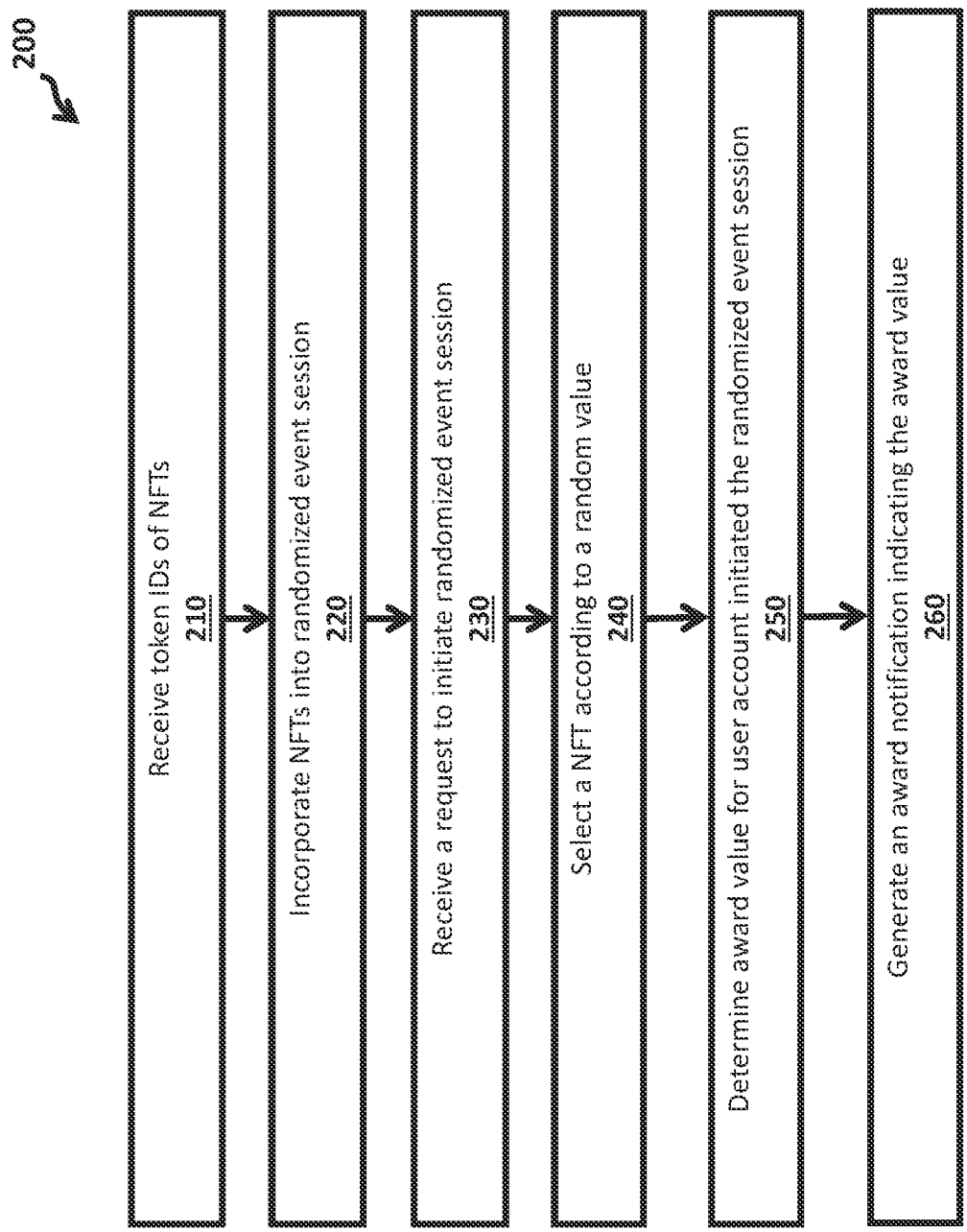
FIG. 2 shows execution steps of a method for executing a randomized event session based on NFTs, according to an embodiment.

FIG. 2 shows execution steps of a method 200 for executing a randomized event session based on NFTs, according to an embodiment. Embodiments may include additional, fewer, or different operations than those described in the method 200. The method 200 is performed by a server (e.g., host device of event host system) executing machine-readable software code associated with a distributed ledger ecosystem of participating nodes, though it should be appreciated that one or more computing devices or processors may perform the various operations described in FIG. 2. For example, one or more steps of the method 200 may be performed by the client device operated by a user. For example, one or more steps of the method 200 may be performed by a shared computing device (e.g., kiosk) that is publicly available and operated by the same entity that operates the event host system.

In step 210, the server receives token IDs of NFTs from one or more client devices operated by one or more owners or custodians of NFTs. Each NFT may be identified by a unique token ID. The server may receive, from the one or more client devices, one or more token IDs and a permission indication to utilize NFTs or media data associated with the NFTs in randomized event sessions. The server may query the blockchain control system and access NFTs referenced by the token IDs. For example, the server may transmit, to the blockchain control system, an access request including token IDs of the NFTs to access the NFTs. In response to the request, the server may receive, from the blockchain control system or from the blockchain, the requested NFTs or receive information or key to access the requested NFTs. In case the NFTs encompass media data, the server may obtain the media data directly from the NFTs. In case the NFTs include identifiers, addresses, or pointers of storage medium storing media, the server may obtain the media from the storage medium as indicated or referenced by the identifiers, addresses, or pointers in the NFTs. In some cases, the server may receive token IDs of NFTs from a client device operated by a user who intends to participate in, or contribute NFTs to, a randomized event session. The server sends a request to the client device to incorporate the NFTs into the randomized event session, and the client device or the server determines whether a blockchain wallet of the user contains the token IDs (or any other addressing identifier) for the NFTs. In some cases, the client device generates an approval request notification or approval interface that prompts the user of the client device to indicate which NFTs are offered to the server when generating the randomized event session. The client device contains or remotely accesses the blockchain wallet of the user to query for the NFTs. If the blockchain wallet includes the token IDs or addresses for the NFTs, then client device updates a transaction block or transaction data of the blockchain to indicate that the NFTs are in temporary control of a blockchain wallet of the server.

In step 220, the server incorporates NFTs into randomized event sessions. For example, the server assigns image data or video data stored by the host database to corresponding reels of a slot machine game session or a roulette game session. The image data or video data may be presented at corresponding reels through the user interface, whether presented on a client device such as a mobile phone or a slot machine in a casino. Each reel may be assigned to a corresponding value (or a reel number), such that a reel or a corresponding NFT can be identified by the corresponding value (or the reel number). In one aspect, the server determines weighted values of NFTs (or weighted values of the associated media) for setting or preparing the randomized event session, according to the weighted values of the NFTs (or weighted values of the media). For each NFT, the server may query the blockchain control system, oracle device, or other public market platform (e.g., Rarible, NFT stars, Crypto.com, VeVe, etc.), and determine the weighted value of the NFT to be proportional to the last traded market value of the NFT, or an average market value of the NFT over a predetermined time period (e.g., 6 months). Alternatively or additionally, the server may determine a type of digital media of the NFT, and assign a corresponding value for the determined type as the weighted value of the NFT. Examples of types of digital media include image data type, video data type, audio data type, etc. The types of digital media may be also categorized according to subject or content in the digital media data (e.g., animal image type, symbol image type, automobile image type, celebrity image type, cartoon image type, etc.). The server may also determine the weighted value of the NFT to be proportional to an average market value of NFTs owned by the same owner or associated with the same blockchain wallet address.

In some embodiments, the server selects, from a set of NFTs, a subset of NFTs to incorporate into the randomized event session. For example, the number of slots available in a roulette game session may be limited to 37, so the server selects 37 NFTs from over thousands of potential NFTs to incorporate into the roulette game session. The server may select the subset of NFTs randomly or according to any number of preconfigured selection rules (e.g., placement auction bids). The server may change NFTs for randomized event sessions periodically (e.g., every 10 sessions or every day), such that different NFTs can be utilized in different randomized event sessions. In one approach, the server receives bids for a placement auction from owners of the NFTs competing to incorporate the NFTs into the randomized event session. The server selects a subset of the NFTs corresponding to highest or winning bids.

In one approach, the server may adjust a probability of success in the randomized event session, according to the weighted values of the NFTs (or values of the media data). The probability of success for media data or NFT may be inverse proportional to the weighted value of the media data or the NFT. Assuming for an example that a first image of a particular dog has a higher value than a second image of a raven, the server may assign or allocate the first image of the dog to a fewer number of slots than a number of slots allocated for the second image of the raven in a slot machine game session or a roulette game session. Hence, the probability of winning the slot machine game session or the roulette game session with the images of the dog may be lower than the probability of winning the slot machine game session or the roulette game session with the images of the raven.

In step 230, the server receives a request to initiate randomized event session. The server may receive the request from a session client device. A session client device may be a client device operated by an owner of the client device, or a shared computing device (e.g., kiosk) that is publicly available and operated by the same entity that operates the event host system. The request may include a blockchain wallet address or an account information (e.g., credit or bank account information) of a user of the session client device, and an amount of wager or an amount of risk to participate in the randomized event session. The amount of wager may be predetermined by the host device or selected by the user through the user interface executed by the session client device. The blockchain wallet address may be an address of a blockchain wallet of the blockchain control system or a different blockchain control system. The host device may query the blockchain control system to verify whether the blockchain wallet address is valid or not, and whether sufficient funds (e.g., crypto-assets) exist for the blockchain wallet address. Similarly, the host device may query the third-party device operated by a financial institution to verify whether the user account is valid or not, and whether sufficient funds (e.g., crypto-assets) exist for the user account. In some embodiments, the request also includes a user-selection in the randomized event session. For example in a roulette game session, the user may select one or more slots including a particular digital media or image.

In step 240, the server selects a NFT according to random value. In response to verifying that the user has sufficient funds to participate in the randomized event session, the server executes randomization algorithm configured to randomly identify or select a token ID from a set of token IDs corresponding to available slots in the random event session. For example, the randomization algorithm may generate one or more random values, where the one or more random values may correspond to one or more reels or token IDs. In some embodiments, the server determines the outcome of the randomized event session, by determining whether a particular pattern or sequence of random values is generated. For example, in a slot machine game session, the server determines that the user is successful in the randomized event session, if three identical random values are generated. In some embodiments, the server determines the outcome of the randomized event session, by comparing (i) a random value generated and (ii) a reel number of an image or NFT selected by the user. For example, in a roulette machine game session, the server determines that the user is successful in the randomized event session, if the random value generated matches a pocket value or a pocket number associated with the selected image or NFT. In some embodiments, the step 240 is performed by the session client device or the shared public device.

In step 250, the server determines an award value for a user account that initiated the randomized event session. The server determines the award for the user account associated with the session client device that participated in or initiated the randomized event session based on NFTs. The award may correspond to or may be proportional to the amount of wager in the request from the session client device. The server may provide different amounts of award for the success in the randomized event session to the session client device, according to weighted values of the NFTs or weighted values of media data associated with the NFTs. In one approach, the server may determine the amount of award for the success in the randomized event session, according to the adjusted probability of success. For example, the server may assign or allocate a larger amount of award, if the user wins the slot machine game session or the roulette game session with an image having a lower probability of success. The server may determine the award by multiplying the amount of wager in the request by a coefficient that is inverse proportional to the probability of success for that NFT, or by multiplying the amount of wager in the request by the weighted value.

The server further determines another award value for the owner of the NFT, according to the owner's user account information stored in a database (e.g., host database 104). The server determines this second award value as a fraction of the award payed to the winning player. The server distributes this second award value to the owner(s) of the particular NFT(s) that contributed to the success in the randomized event session (as described below with respect to FIG. 3).

As an example, the server hosts a roulette game accessed by a client device (e.g., personal computer, gaming device in a casino), and executes the randomization algorithm to select a winning NFT. The server determines whether a player-user entered inputs guessing that the particular winning NFT would be selected and placing a related wager. If the player successfully guessed the winning NFT, the server determines the first award value based on one or more criteria (e.g., amount wagered by the player; scarcity or likelihood that the winning NFT could be selected; etc.). The server then determines a second award value as a royalty or payout to the owner of the winning of the NFT, based on one or more criteria (e.g., preconfigured fixed payout value; market or purchase value of the NFT; etc.).

As an example, the server hosts a slots game accessed by the client device (e.g., personal computer, gaming device in a casino), and executes the randomization algorithm to select a set of selected NFTs. The server incorporates a plurality of NFTs into a set of wheels of the virtual slot machine, where each wheel includes the same plurality of NFTs. The server assigns or determines a gaming-value associated with each particular NFT based upon one or more criteria (e.g., market or purchase value of the NFT; scarcity of the NFT; random value). For each wheel, the randomization algorithm randomly selects a selected NFT, and the server determines the player's score based upon the gaming-values of the selected NFTs. The server determines whether the player's score satisfies one or more winning thresholds that correspond to one or more payout amounts. For instance, where there is only one winning threshold, then the server determines that the player wins if the player's score satisfies the winning threshold. But where there are two or more winning thresholds, then server determines that the player wins if the player's score satisfies a first winning threshold and then further determines a first award value according to the winning thresholds satisfied by the player's score. In a "competitive" slots embodiment, the server selects a set of selected NFTs for each of the player-users. The server identifies the winning player by comparing each player's score, where the winning player received the comparatively better player score according to preconfigured comparative scoring rules.

If the player won or satisfied a particular winning threshold, then the server determines a second award value as a royalty or payout to the owner of the selected NFT based on one or more criteria (e.g., preconfigured fixed payout value; market or purchase value of the NFT; etc.). In some cases, the player could win even when the randomization algorithmic selected different NFTs. In such cases, the server determines award values as royalties or payouts to each owner of the selected NFTs based on the one or more criteria.

In step 260, the server generates an award notification indicating the award value. The server executes smart contract programming of the blockchain or separate software programming to identify a payment account of the blockchain control system or a third-party device operated by a financial institution (e.g., bank or credit card issuer) associated with the user account that initiated the randomized event session. The server may include a database (e.g., host database 104) that stores, for different user accounts, corresponding payment accounts. The server may retrieve, from the database, the payment account associated with the user account. In case the payment account for the user account is not available or invalid, the server may instruct the client device associated with the user account to generate a user interface prompting the user to input the payment account information. The server generates the award notification authorizing payment of the award value to the identified payment account. The server may transmit the award notification to the blockchain control system or the third-party device operated by the financial institution associated with the payment account to authorize payment of the award to the payment account associated with the user account.

In one approach, the server generates award notifications indicating award values for user accounts associated with owners of NFTs that were selected or contributed to success in the randomized event session. For each user account associated with an owner of NFT(s) that were selected or contributed to success in the randomized event session, the server executes smart contract programming of the blockchain or separate software programming to identify a payment account of the blockchain control system or the third-party device operated by the financial institution (e.g., bank or credit card company) from the database (e.g., host database 104). For each user account associated with an owner of NFT(s) that were selected or contributed to success in the randomized event session, the server generates the corresponding award notification authorizing payment of the award value to the identified payment account. The server may transmit, for each user account associated with an owner of NFT(s) that were selected or contributed to success in the randomized event session, the award notification to the blockchain control system or the third-party device associated with the corresponding payment account to authorize payment of the award to the payment account associated with the user account.

Figure 3:
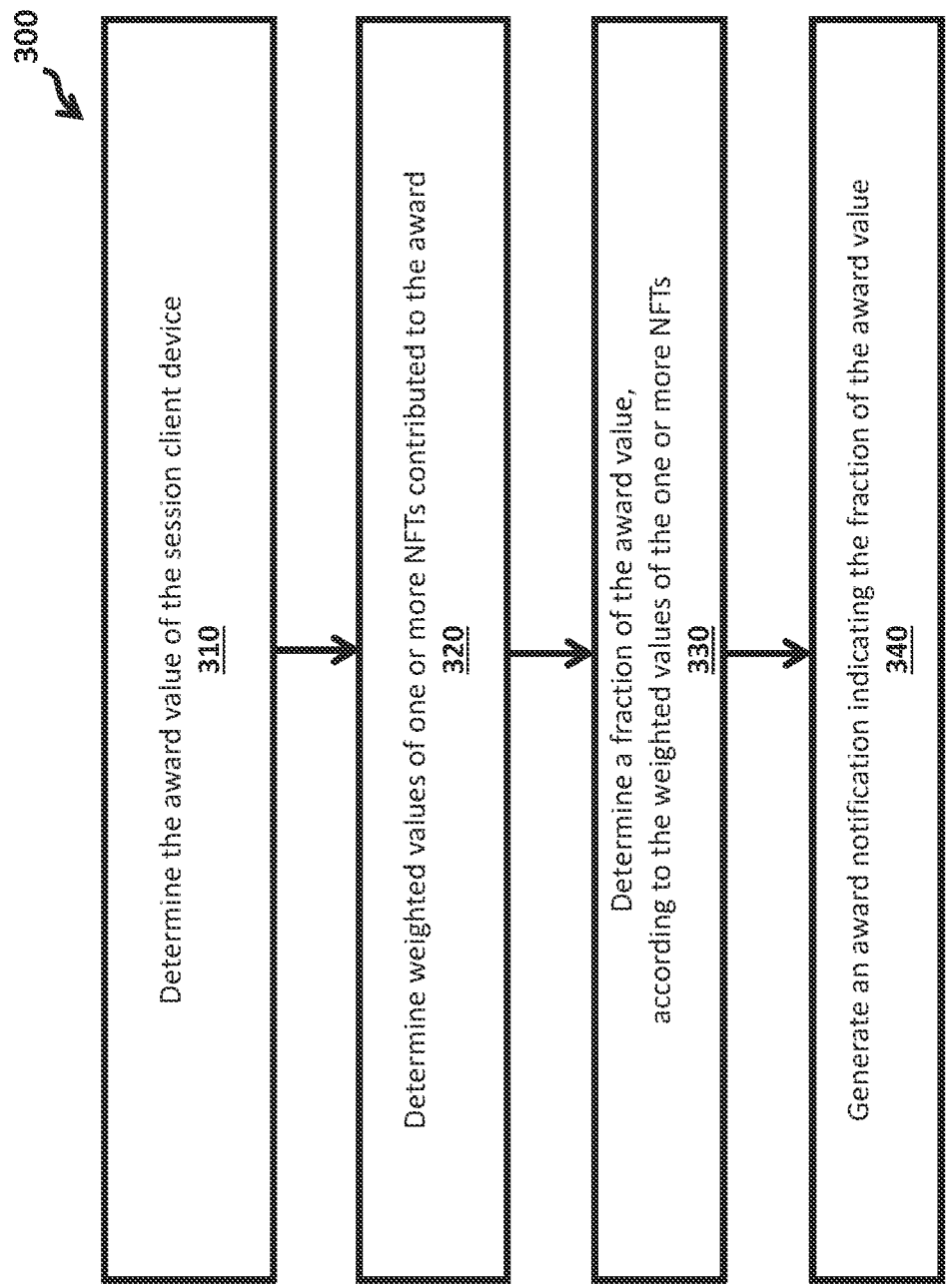
FIG. 3 shows execution steps of a method for distributing award to owners of NFTs for a randomized event session based on NFTs, according to an embodiment.

FIG. 3 shows execution steps of a method 300 for distributing award to user accounts associated with owners of NFTs for a randomized event session based on NFTs, according to an embodiment. Embodiments may include additional, fewer, or different operations than those described in the method 300. The method 300 is performed by a server (e.g., host device of an event host system) executing machine-readable software code associated with a distributed ledger ecosystem of participating nodes, though it should be appreciated that one or more computing devices or processors may perform the various operations described in FIG. 3.

In step 310, the server determines the award value of the session client device. The award value may be an award of wining or success in a randomized event session incorporating one or more NFTs. In one aspect, the award value corresponds to the award value determined (e.g., as determined in the step 250 of FIG. 2).

In step 320, the server determines a weighted value of a NFT contributed to the award. The NFTs contributed to the award may be a NFT or media data that is selected to win the randomized event session. A weighted value of a NFT may correspond to or may be proportional to the market value of the NFT traded on a public market platform (e.g., Rarible, NFT stars, Crypto.com, VeVe, etc.). In one aspect, the server assigns a weighted value for a NFT, according to a number of other NFTs having the media data, a currency value, a third-party value received from a third-party device, or any combination of them. For each NFT, the server may query the blockchain control system or other public market platform (e.g., Rarible, NFT stars, Crypto.com, VeVe, etc.), and determine the weighted value of the NFT to be proportional to the last traded market value of the NFT, or an average market value of the NFT over a predetermined time period (e.g., 6 months). Alternatively or additionally, the server may determine a type of digital media of the NFT, and assign a corresponding value for the determined type as the weighted value of the NFT. Examples of types of digital media include image data type, video data type, audio data type, etc. The types of digital media may be also categorized according to subject or content in the digital media data (e.g., animal image type, symbol image type, automobile image type, celebrity image type, cartoon image type, etc.). The server may also determine the weighted value of the NFT to be proportional to an average market value of NFTs owned by the same owner or associated with the same blockchain wallet address.

In step 330, the server determines a fraction of the award value for a user account associated with the NFT, according to the weighted value of the NFT. In one approach, the server multiplies the award value of the session client device determined in the step 310 by a coefficient that is proportional to the weighted value of the NFT determined in the step 320. In one aspect, different NFTs may have different fractions of the award value, according to the corresponding weighted values.

In step 340, the server generates an award notification indicating the fraction of the award value. For the user account associated with an owner of the NFT that was selected or contributed to success in the randomized event session, the server identifies a payment account of the blockchain control system or the third-party device operated by the financial institution (e.g., bank or credit card company) from the database (e.g., host database 104). For the user account associated with an owner of NFT that was selected or contributed to success in the randomized event session, the server generates the award notification authorizing payment of the award value to the identified payment account. The server may transmit the award notification to the blockchain control system or the third-party device operated by the financial institution associated with the payment account to authorize payment of the award to the payment account associated with the user account.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, attributes, or memory contents. Information, arguments, attributes, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   receiving, by a computer, one or more token identifiers corresponding to one or more non-fungible tokens of a blockchain, each respective non-fungible token of the one or more non-fungible tokens including corresponding media data indicating a storage medium;
   configuring, by the computer, a virtual slot machine by assigning each non-fungible token as an image on a wheel extracted from the storage medium indicated by the media data of the corresponding non-fungible token;
   executing, by the computer, a randomization algorithm for a session that randomly identifies a pay line image on each wheel of a pay line, the pay line image is the image based upon the media data of the corresponding non-fungible token;
   determining, by the computer, a weighted award value assigned to each non-fungible token in the session for the virtual slot machine based in part on rarity of each non-fungible token;
   generating, by the computer, a first award notification indicating a payout for display, the payout determined based upon the weighted award value for each non-fungible token indicated by each pay line image randomly identified by the randomization algorithm; and
   for each wheel of the pay line, generating, by the computer, a second award notification indicating a fraction of the payout value to a third-party computing device associated with a non-fungible token owner's blockchain wallet having the non-fungible token associated with the pay line image on the wheel.

2. The method according to claim 1, wherein generating the second award notification includes transmitting, by the computer, the second award notification to the third-party computing device indicating the fraction of the payout value.

3. The method according to claim 1, wherein configuring the virtual slot machine includes generating, by the computer, a user interface including a display of the virtual slot machine.

4. The method according to claim 3, further comprising updating, by the computer, the user interface including the display of the virtual slot machine according to the randomization algorithm.

5. The method according to claim 1, further comprising for each wheel, identifying, by the computer, a winning token identifier for a winning non-fungible token associated with the pay line image randomly identified according to the randomization algorithm.

6. The method according to claim 1, further comprising transferring, by the computer, the non-fungible token from the non-fungible token owner's blockchain wallet to a second blockchain wallet according to a smart contract associated with the non-fungible token of the blockchain.

7. The method according to claim 6, further comprising updating, by the computer executing the smart contract of the blockchain, a transaction block of the blockchain to indicate the non-fungible token is transferred from the non-fungible token owner's blockchain wallet to the second blockchain wallet.

8. The method according to claim 1, wherein receiving the one or more token identifiers includes receiving, by the computer, a permission input from a client device indicating the non-fungible token to incorporate into the session for the virtual slot machine.

9. A system comprising:
a computer comprising a processor configured to:
receive one or more token identifiers corresponding to one or more non-fungible tokens of a blockchain, each non-fungible token including corresponding media data indicating a storage medium;
configure a virtual slot machine by assigning each non-fungible token as an image on a wheel extracted from the storage medium indicated by the media data of the corresponding non-fungible token;
execute a randomization algorithm for a session that randomly identifies a pay line image on each wheel of a pay line, the pay line image is the image based upon the media data of the corresponding non-fungible token;
determine a weighted award value assigned to each non-fungible token in the session for the virtual slot machine based in part on rarity of each non-fungible token;
generate a first award notification indicating a payout for display, the payout determined based upon the weighted award value for each non-fungible token indicated by each pay line image randomly identified by the randomization algorithm; and
for each wheel of the pay line, generate a second award notification indicating a fraction of the payout value to a third-party computing device associated with a non-fungible token owner's blockchain wallet having the non-fungible token associated with the pay line image on the wheel.

10. The system according to claim 9, wherein when generating the second award notification the computer is further configured to:

transmit the second award notification to the third-party computing device indicating the fraction of the payout value.

11. The system according to claim 9, wherein when configuring the virtual slot machine the computer is further configured to:
generate a user interface including a display of the virtual slot machine a computing device.

12. The system according to claim 11, wherein the computer is further configured to update the user interface including the display of the virtual slot machine according to the randomization algorithm.

13. The system according to claim 9, wherein the computer is further configured to for each wheel, identify a winning token identifier for a winning non-fungible token associated with the pay line image randomly identified according to the randomization algorithm.

14. The system according to claim 9, wherein the computer is further configured to transfer the non-fungible token from the non-fungible token owner's blockchain wallet to a second blockchain wallet according to a smart contract associated with the non-fungible token of the blockchain.

15. The system according to claim 14, wherein the computer is further configured to update, according to the smart contract, a transaction block of the blockchain to indicate the non-fungible token is transferred from the non-fungible token owner's blockchain wallet to the second blockchain wallet.

16. The system according to claim 9, wherein when receiving the one or more token identifiers the computer is further configured to:
receive a permission input from a client device indicating the non-fungible token to incorporate into the session for the virtual slot machine.

17. A computer-implemented method comprising:
receiving, by a computer, one or more token identifiers for one or more non-fungible tokens of a blockchain, each non-fungible token including corresponding media data indicating a storage medium, wherein for each particular non-fungible token a smart contract of the blockchain transfers the particular non-fungible token for temporary control at a first blockchain wallet associated with the computer from a non-fungible token owner's blockchain wallet;
configuring, by the computer, a virtual slot machine by assigning each non-fungible token as an image on a wheel extracted from the storage medium indicated by the media data of the corresponding non-fungible token;
executing, by the computer, a randomization algorithm for a session that randomly identifies a pay line image on each wheel;
identifying, by the computer, a winning token identifier for the non-fungible token corresponding to the pay line image, the winning token identifier associated with a payout based upon a rarity each non-fungible token corresponding to the pay line image;
for each winning token identifier, generating, by the computer, an award notification indicating a fraction of the payout value for a third-party computing device associated with the non-fungible token owner's wallet having the winning token identifier; and
transferring, by the computer, the non-fungible token from the first blockchain wallet to the non-fungible token owner's blockchain wallet according to the smart contract associated with the non-fungible token of the blockchain.

18. The method according to claim 17, wherein the non-fungible token owner's blockchain wallet is associated with a host entity hosting the virtual slot machine.

19. The method according to claim 17, further comprising receiving, by the computer, an initiate request from a client device associated with the session, wherein the computer executes the randomization algorithm in response to receiving the initiate request.

20. The method according to claim 17, wherein receiving the one or more token identifiers includes receiving, by the computer, a permission input from a client device indicating the non-fungible token to incorporate into the virtual slot machine.

21. The method according to claim 17, further comprising:
determining, by the computer, the fraction of the payout value of the award notification for the third-party computing device based upon the winning token identifier of the non-fungible token identified by the randomization algorithm.

22. The method according to claim 17, wherein configuring the virtual slot machine includes generating, by the computer, a user interface including a display of the virtual slot machine.

23. The method according to claim 22, further comprising updating, by the computer, the user interface including the display of the virtual slot machine according to the randomization algorithm.

24. A system comprising:
a computer comprising one or more processor configured to:
receive one or more token identifiers for one or more non-fungible tokens of a blockchain, each non-fungible token including corresponding media data indicating a storage medium, wherein for each particular non-fungible token a smart contract of the blockchain transfers the particular non-fungible token for temporary control at a first blockchain wallet associated with the computer from a non-fungible token owner's blockchain wallet;
configure a virtual slot machine by assigning each non-fungible token as an image on a wheel;
execute a randomization algorithm for a session that randomly identifies a pay line image on each wheel extracted from the storage medium indicated by the media data of the corresponding non-fungible token;
identify a winning token identifier for the non-fungible token corresponding to the pay line image, the winning token identifier associated with a payout based upon a rarity each non-fungible token corresponding to the pay line image;
for each winning token identifier, generate an award notification indicating a fraction of the payout value for a third-party computing device associated with the non-fungible token owner's wallet having the winning token identifier; and
transfer the non-fungible token from the first blockchain wallet to the non-fungible token owner's blockchain wallet according to the smart contract associated with the non-fungible token of the blockchain.

25. The system according to claim 24, wherein the non-fungible token owner's blockchain wallet is associated with a host entity hosting the virtual slot machine.

26. The system according to claim 24, wherein the computer is further configured to receive an initiate request from a client device associated with the session, and wherein the computer executes the randomization algorithm in response to receiving the initiate request.

27. The system according to claim 24, wherein when receiving the one or more token identifiers the computer is further configured to:
receive a permission input from a client device indicating the non-fungible token to incorporate into the virtual slot machine.

28. The system according to claim 24, wherein the computer is further configured to:
determine fraction of the payout value of the award notification for the third-party computing device based upon the winning token identifier of the non-fungible token identified by the randomization algorithm.

29. The system according to claim 24, wherein when configuring the virtual slot machine the computer is further configured to:
generate a user interface including a display of the virtual slot machine.

30. The system according to claim 29, wherein the computer is further configured to update the user interface including the display of the virtual slot machine according to the randomization algorithm.

* * * * *